United States Patent
Huffman et al.

(10) Patent No.: US 7,800,743 B1
(45) Date of Patent: Sep. 21, 2010

(54) METHOD AND APPARATUS FOR FIBER OPTIC SIGNATURE RECOGNITION

(75) Inventors: John Huffman, Conyers, GA (US); Peter Cornell, Metuchen, NJ (US)

(73) Assignee: AT&T Corp., New York, NY (US)

( * ) Notice: Subject to any disclaimer, the term of this patent is extended or adjusted under 35 U.S.C. 154(b) by 44 days.

(21) Appl. No.: 11/585,639

(22) Filed: Oct. 24, 2006

(51) Int. Cl.
G01N 21/00 (2006.01)

(52) U.S. Cl. .................................. 356/73.1; 398/11

(58) Field of Classification Search ............. 356/73.1; 398/9–19, 32–33, 196–197
See application file for complete search history.

(56) References Cited

U.S. PATENT DOCUMENTS 5,004,964 A * 4/1991 Kataoka et al. ............ 318/128
5,355,208 A * 10/1994 Crawford et al. ........... 356/35.5
5,778,114 A 7/1998 Eslambolchi et al.
2001/0045495 A1 * 11/2001 Olson et al. ................ 246/121

FOREIGN PATENT DOCUMENTS

WO    WO 94/00732    *   1/1994

* cited by examiner

*Primary Examiner*—Tarifur Chowdhury
*Assistant Examiner*—Tara S Pajoohi

(57) ABSTRACT

A method and apparatus is disclosed for use in fiber optic signature recognition to analyze buried optical fiber to identify a non-threat area along a fiber route and to discontinue monitoring for disturbances along that area of the cable route. The technique includes determining the location of the zone of non-threatening disturbances from comparing an optical signal to the representation of a prearranged optical signal identified as friendly. Once a zone of non-threatening disturbances is identified, all subsequent disturbances in that zone are considered friendly. Cable monitoring is discontinued in the identified zone of non-threatening disturbances so as to avoid monitoring fiber cable when permitted workers are in the area.

21 Claims, 4 Drawing Sheets

METHOD AND APPARATUS FOR FIBER OPTIC SIGNATURE RECOGNITION

FIELD OF THE INVENTION

The present invention relates generally to techniques for detecting ground vibrations caused by disturbances along a buried optical fiber. More particularly, the present application relates to using a prearranged signal which is understood as a non-threat to the system to determine a zone of non-threatening disturbances and to discontinue monitoring or ignore optical signals along that portion of the cable route.

BACKGROUND OF THE INVENTION

U.S. Pat. No. 5,778,114 (the "114 patent"), assigned to the same assignee as the present application and incorporated by reference herein, discloses a system that allows fiber optics to be used as a sensor and that can detect signals/activities along a cable right of way. This system operates by sending pulses of light signals down a fiber of a telecommunications plant, and detecting return signals generated along the fiber path. This will allow detection of various vibrations and frequency patterns generated in the vicinity of the fiber cable. These return signals are broken down into discrete sections along the cable and are analyzed to determine the type and location of the disturbance causing the vibration. Once a disturbance is detected the system will alert personnel to analyze the disturbance.

The '114 patent discloses a fiber sensing system that allows monitoring a fiber cable route for disturbances along its path. This device can detect personnel walking, running, digging, and vehicles, etc. along the cable right of way. This system will operate via the fiber and can look at fiber in 20 meter increments over a 25 mile span. This device operates on the same principle as an OTDR fiber test set. Disturbances along the fiber cable can be detected and analyzed by the system. Disturbances can be identified based on known patterns or frequencies generated by the disturbance. For example, a person running and a person walking can be distinguished from each other based on the pattern generated from monitoring the fibers.

Often personnel work in the area of the fiber cable. Those personnel may be authorized maintenance personnel that are aware of the underground fiber cable, or may be unauthorized personnel that present a threat to the underground plant. When a disturbance is detected, a fiber owner must investigate each disturbance. In the case of a threat being detected, a crew is sent to the site to investigate. False alarms are cost intensive and involve expensive manual overhead. What is needed is a way to distinguish non-threat disturbances from disturbances which really threaten the cable so to reduce the number of false alarms in investigating cable threats. If there is a legitimate disturbance such as scheduled maintenance near a cable route, this disturbance is a non-threat and can be ignored. When monitoring a cable route, if there are workers present in an area, there is a need to identify them as a non threat to the system.

SUMMARY OF THE INVENTION

The present invention addresses the needs described above by providing a method and apparatus for identifying a zone of non-threatening disturbances along a buried optical fiber cable by comparing a disturbance signal along a fiber with a prearranged set of disturbances and discontinuing monitoring of this zone of non-threatening disturbances. The system does not require an exact match of the prearranged signal to the optical signal generated from the disturbance. It uses an approximation algorithm that takes into account environmental conditions and matches based on a close similarity. For example, soil conditions may be more packed in some areas affecting the low frequency ground vibrations. The match in this case would occur for a range of soil conditions.

The invention may be used as a security device to protect a perimeter by burying the cable along a perimeter and distinguishing threatening and non-threatening disturbances.

One embodiment is a method of identifying a zone of non-threatening disturbances along a buried optical fiber cable. The method comprises the steps of receiving an optical signal including a light pattern caused by a low frequency ground vibration at a location along the fiber; comparing the received signal to a representation of a prearranged optical signal; and, if the received signal and the prearranged signal match, identifying the zone of non-threatening disturbances at the location.

The method may further include the steps of receiving a second optical signal including a light pattern caused by a second low frequency ground vibration at a location along the fiber; determining a location of the second vibration; and if the location of the second vibration is in the zone of non-threatening disturbances, then determining that the second vibration is non-threatening.

The method may include the step of identifying the zone of non-threatening disturbances. The method may include discontinuing monitoring optical signals from the zone.

The method may further comprise the step of introducing the low frequency ground vibration using a crystal controlled oscillator. The oscillator in that method may be a motorized rod. The oscillator in that method may be a metal plate placed on the ground. The crystal controlled oscillator may be attached to a piece of equipment such that the vibration is transmitted into the ground though the equipment.

The oscillator in that method may further include a rechargeable battery power supply for operating the motor driven rod.

A second embodiment of the invention is an apparatus for distinguishing ground vibrations caused by threatening and non-threatening disturbances along an optical fiber cable. The apparatus for distinguishing ground vibrations includes a light source for introducing a beam of light into the optical fiber cable; a detector for receiving an optical signal from the optical fiber cable, the signal including light from the introduced beam having characteristics caused by the ground vibrations; a processor connected for receiving information from the detector; memory media connected to the processor and containing a representation of a prearranged optical signal; memory media connected to the processor and containing a set of executable instructions that, when executed, cause the processor to receive an optical signal from the optical fiber cable, compare the signal with the representation of a prearranged optical signal, and, if the optical signal matches the prearranged optical signal, identify a zone of non-threatening disturbances at the location.

The apparatus may further comprise executable instructions further causing the processor to receive a second optical signal including a light beam having characteristics caused by a second low frequency ground vibration at a location along the fiber; to determine a location of the second vibration; and, if the location of the second vibration is in the zone of non-threatening disturbances, then to determine that the second vibration is non-threatening.

The apparatus may further include the step of identifying the zone of non-threatening disturbances includes discontinuing monitoring optical signals from the zone.

The apparatus may further include a crystal controlled oscillator for introducing the low frequency ground vibration. The oscillator may be a motorized rod. The oscillator may be a metal plate placed on the ground. The crystal controlled oscillator may be attached to a piece of equipment such that the vibration is transmitted into the ground though the equipment. The oscillator may further include a rechargeable battery power supply for operating the motor driven rod.

A third embodiment of the invention is a method of identifying a zone of non-threatening disturbances along a buried optical fiber cable. The method comprises the steps of receiving a first optical signal including a light pattern caused by a first low frequency ground vibration; determining that the first optical signal is a prearranged signal indicating non-threatening disturbances; determining a location of the first low-frequency ground vibration along the buried optical fiber; receiving a second optical signal including a light pattern caused by a second low frequency ground vibration at a location along the fiber; determining a location of the second low-frequency ground vibration along the buried optical fiber; and if the locations of the first and second low-frequency ground vibrations are within a predetermined distance, identifying the second low-frequency ground vibration as being caused by a non-threatening disturbance.

The method may include the step of determining that the first optical signal is a prearranged signal indicating non-threatening disturbances comprises comparing the first optical signal to a representation of a prearranged optical signal.

The method may further comprise the step of introducing the first low frequency ground vibration using a crystal controlled oscillator. The crystal controlled oscillator in the method may be attached to a piece of equipment such that the vibration is transmitted into the ground though the equipment.

A fourth embodiment of the invention is a method of monitoring a perimeter for disturbances. The method comprises the steps of burying an optical fiber cable along the perimeter; receiving an optical signal including a light pattern caused by a low frequency ground vibration at a location along the fiber; comparing the received signal to a representation of a prearranged optical signal; and recognizing the optical signal as caused by ground vibrations from a non-threatening source based on the comparing of the received signal to a representation of a prearranged optical signal.

DESCRIPTION OF THE INVENTION

The inventors have developed a method and apparatus for conducting improved fiber optic signature recognition. The apparatus and method reduce the overhead of monitoring the cable run in its entirety, by identifying sections or zones that are under authorized maintenance. In those sections, active monitoring is not required or disturbances are ignored. The invention includes an oscillator box mechanically connected to the ground for generating known prearranged disturbance vibrations in the area where authorized maintenance is taking place. These prearranged vibrations are picked up by a Fiber Threat Analysis System (FTAS) and recognized as a non threat. A location of the known vibration is determined, and the system establishes a zone of non-threatening disturbances based on that location. In the zone further disturbances may be either ignored or not monitored.

In one version of the invention the oscillator box includes a metallic box with a vibrating rod that will tamp out signals or vibrations into the ground at a known rate and pattern. Another version of the apparatus can be attached to a piece of construction equipment such that the vibration can be transmitted into the ground though the wheels or tracks of the vehicle. A third version of the apparatus sits on a metal plate on the ground. The unit includes a motor under the control of a crystal to generate an oscillatory frequency. The unit has a rechargeable battery power supply that operates the motor driven parts.

The method may also be used in perimeter monitoring to secure a border. The method monitors disturbances along a fiber cable that is buried in the ground along a border perimeter. Disturbances are detected and notifications sent to a monitoring system to keep the area secure.

Figure 1:
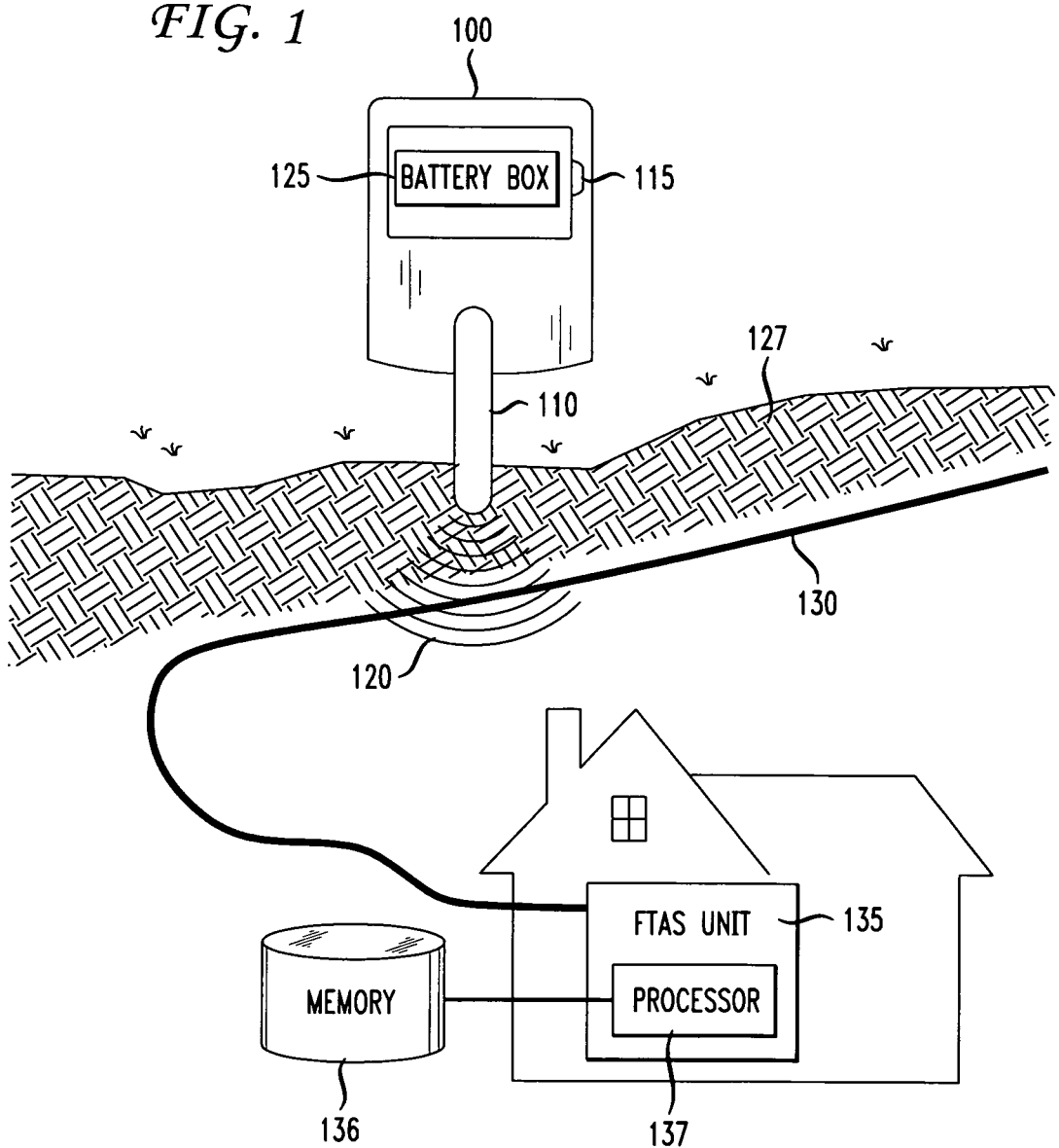
FIG. 1 is a schematic representation of a disturbance device and monitoring system according to one embodiment of the invention.

An apparatus according to one embodiment of the invention includes the crystal controlled vibrator rod, a plurality of controls for operation, a battery box, a fiber cable and a fiber monitoring system. This apparatus provides a set of prearranged disturbances from crystal controlled oscillations and has them vibrate into the ground from the oscillator. FIG. 1 shows an embodiment of schematic representation of a disturbance generating device and monitoring system according to one embodiment of the invention.

The oscillator device 100 includes a vibrating rod 110 that is inserted into the ground 127. A plurality of controls for operation 115, including a crystal, is embedded in the oscillator device 100. A battery box 125 is a rechargeable battery power supply that operates the motor driven vibrating rod 110. The battery box 125 may be connected to a vehicle for power.

Signals in the form of low frequency ground vibrations 120 from the vibrator rod 110 enter the ground 127 around the fiber cable 130. The vibrating rod can be inserted into the ground so that it generates a strong enough signal to create a known disturbance to the fiber cable. The rod is placed in the ground by a maintenance crew, for example, before beginning work near the fiber cable 130. The vibrating rod 110 tamps out a defined pattern that is recognized by the fiber analysis system 135. The vibration pattern is controlled via a frequency pattern generated by the crystal. This crystal holds the vibration to a known frequency pattern, making the vibration identifiable. These identifiable vibration patterns are designed to match the prearranged signals stored in the fiber analysis system.

The FTAS includes a memory such as data storage 136 containing representations of the known, prearranged signals. The FTAS also includes a processor 137 for executing steps according to methods of the invention. The memory may also contain instructions for executing those methods of the invention.

The fiber analysis unit does not require an exact match of signals. For example, the low frequency ground vibration signal from the oscillator device may vary dependent on soil conditions. There are areas where the soil may be tightly packed or other areas where the soil is somewhat looser. The fiber analysis unit does the match taking environmental conditions into account. The fiber analysis unit 135 detects vibration on cable 130 and if it is determined to be a match, labels it a non threat to the cable 130.

Figure 2:
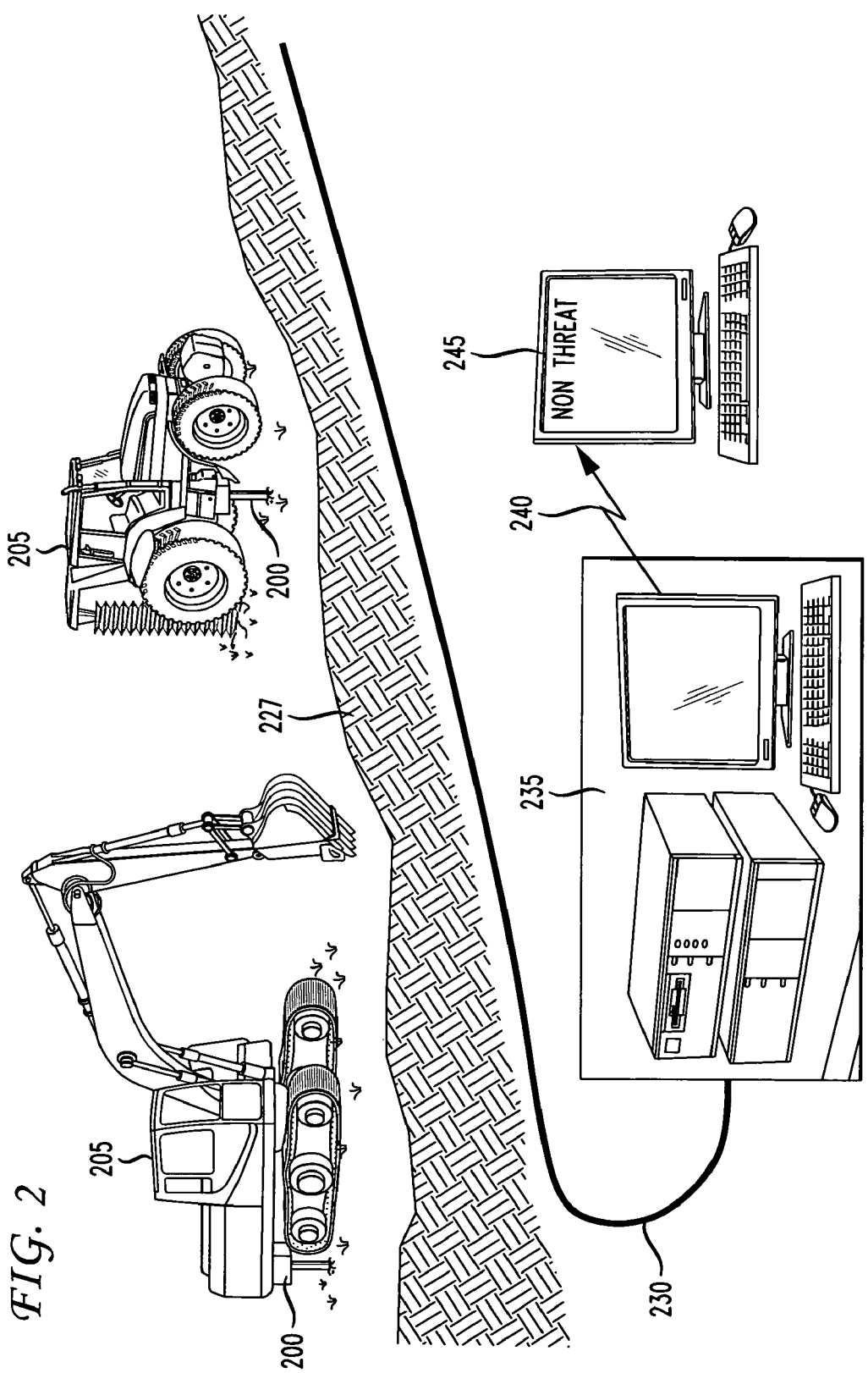
FIG. 2 is a schematic representation of a disturbance creator according to one embodiment of the invention.

A low frequency vibration ground disturbance creator shown in the field according to another embodiment of the invention is shown in FIG. 2.

Two authorized maintenance vehicles 205 are shown working the area around the cable 230. They are excavating the ground 227 as during regular maintenance procedures. Each maintenance vehicle 205 has attached to it a crystal controlled oscillator 200. The oscillator 200 is connected to the ground 227 in the immediate vicinity of the cable 230. The cable is connected to the (FTAS) Fiber Threat Analysis System 235. The FTAS 235, upon recognizing vibrations from the oscillator 200 as the prearranged vibration pattern, sends messages to the service terminal 245 as a notification that the disturbance is a non threat.

Scheduled maintenance work on the cable 230 is being performed by trusted contractors 205. The maintenance vehicles 205 carry an oscillator 200 to identify them as non-threats. As the contractors 205 work, the oscillator 200 generates a known disturbance into the ground identifying these vibrations as friendly thus avoiding the need to monitor this section of the cable for threats. The known vibration is picked up by the FTAS 235 which identifies the vibration as a non threat and sends the notification of non threat 240 to the monitoring device 245.

The method furthermore reduces the need for monitoring areas where friendly personnel are working in the area of the fiber cable. It also requires no special knowledge of the monitoring organization; for example, human monitors do not need to understand disturbance signals or the signal recognition system. The method greatly reduces the overhead in monitoring a cable route and the time to determine that a disturbance is of a non threatening nature.

Figure 3:
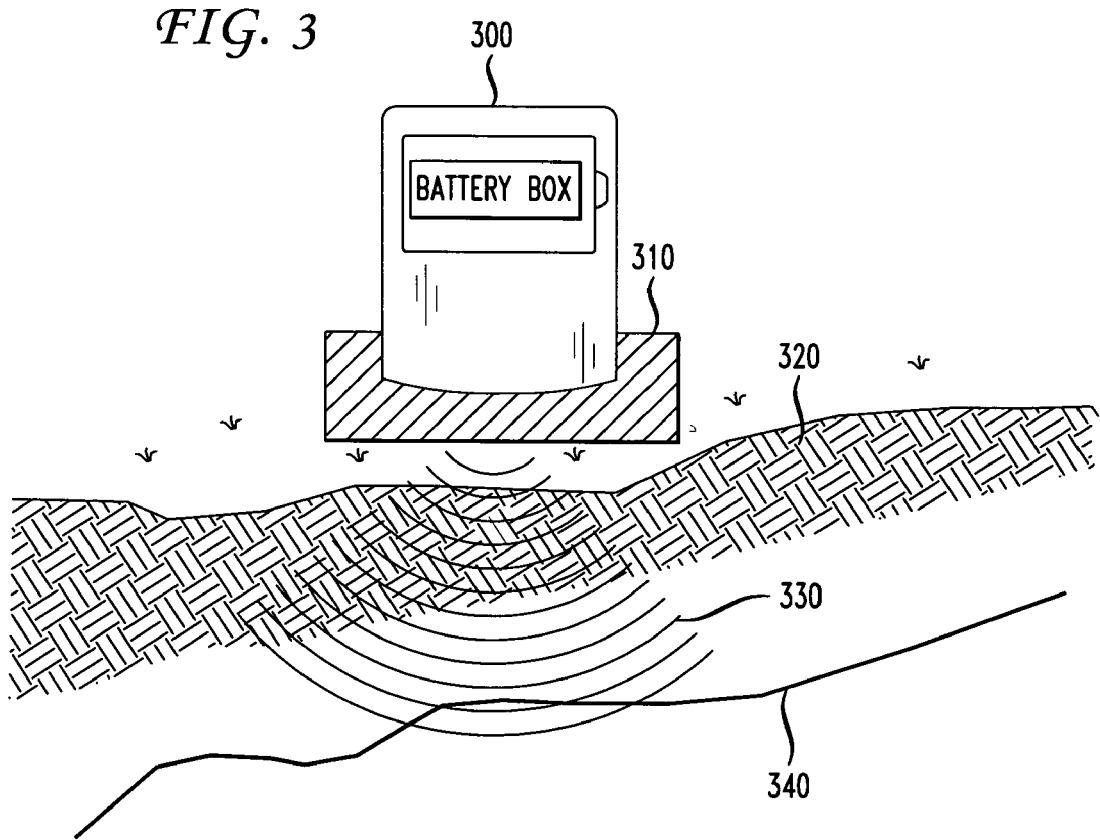
FIG. 3 is a schematic representation of a disturbance creator according to a second embodiment of the invention.

FIG. 3 depicts the oscillatory device situated on a metal plate placed on the ground. Oscillations are generated in the oscillatory box 300. The vibrations travel into the metal plate 310 and directly vibrate into the ground 320. These signals 330 travel as low frequency vibrations through the ground 320 where they contact the fiber cable 340.

Figure 4:
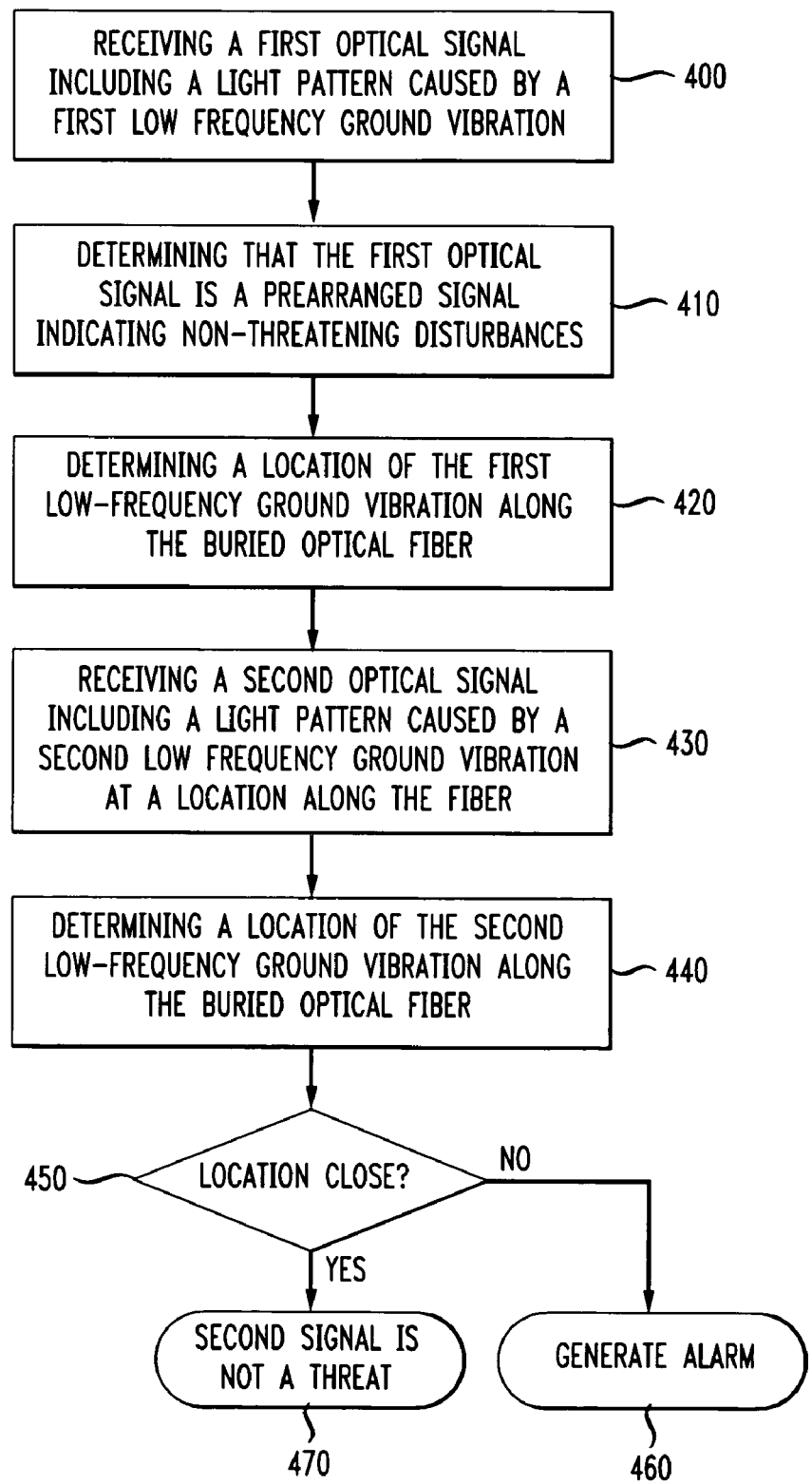
FIG. 4 is a flow chart depicting a method according to one embodiment of the invention.

An exemplary method according to one embodiment of the invention is described with reference to the flow chart of FIG. 4. In a first step 400 of the method, a first optical signal is received including a light pattern caused by a first low frequency ground vibration.

The following two steps 410 and 420 are performed by the fiber analysis unit. The fiber analysis unit determines that the first optical signal received is a prearranged signal indicating a non-threat 410. That determination is made in a preferred embodiment by comparing the received light pattern to stored signal representations. It then determines the location for the first low frequency ground vibration 420. The location may be determined for example, using the techniques described in the '114 patent, discussed above.

The next two steps 430 and 440 process a second received signal. The fiber analysis unit received a second optical signal 430 along the fiber. It then determines the location of the second signal 440.

The fiber analysis unit now has the information it needs to determine if the locations of the 2 received signals are close 450. If the signals are in the same location of the fiber cable, the second signal is labeled as non-threatening. In so doing the fiber analysis unit has effectively defined a zone of non-threatening disturbances at the location. This allows the fiber analysis system to monitor other areas of the fiber cable, and ignore this area as a friendly area.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a disturbance device attached to a piece of construction equipment or placed on or in the ground, the method and apparatus of the invention may be instead embodied by any apparatus that imparts vibrations into the ground. It is further noted that the invention is not limited to use with current technology fiber, as described in this specification, but can be used with any fiber cable technology existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method of identifying a zone of non-threatening disturbances along a buried optical fiber comprising:
   inputting a light into a first end of the buried optical fiber;
   receiving a first optical signal from the first end of the buried optical fiber created by a first low frequency ground vibration received by the buried optical fiber;
   identifying the location along the buried optical fiber where the first low frequency ground vibration was received;
   analyzing the received first optical signal using an approximation algorithm comprising:
     adding environmental condition variables to the received first optical signal forming a conditioned first optical signal;
     comparing the conditioned first optical signal with a set of prearranged optical signals, the prearranged optical signals corresponding to predefined low frequency ground vibration patterns;
     if the comparison determines that the conditioned first optical signal matches one prearranged optical signal from the set of prearranged optical signals, identifying the first low frequency ground vibration location as a non-threatening disturbance; and
     if the comparison determines that the conditioned first optical signal does not match one prearranged optical signal from the set of prearranged optical signals, identifying the first low frequency ground vibration location as a threatening disturbance.

2. The method according to claim 1 further comprising:
   receiving a second optical signal from the first end of the buried optical fiber created by a second low frequency ground vibration received by the buried optical fiber;
   identifying the location along the buried optical fiber where the second low frequency ground vibration was received; and
   identifying the second low frequency ground vibration as a non-threatening disturbance when the second low frequency ground vibration location is within a predetermined distance of the first low frequency ground vibration location.

3. The method according to claim 2 further comprising:
   introducing a low frequency ground vibration into the ground using a vibrator; and controlling the vibrator to produce a low frequency ground vibration signature that matches one or more of the set of prearranged optical signals.

4. The method of claim 3 further comprising attaching the vibrator to a piece of equipment such that the vibrator's low frequency ground vibration signature is transmitted into the ground where the piece of equipment contacts the ground.

5. The method of claim 1 wherein the environmental condition variables condition the received first optical signal according to ground characteristics such as packed, loose, wet and dry soil at the location of the first low frequency ground vibration.

6. A system for distinguishing ground vibrations created by threatening and non-threatening disturbances along a buried optical fiber comprising:
    a light source configured to introduce a beam of light into a first end of the buried optical fiber;
    a detector configured to receive optical signals from the first end of the buried optical fiber, each received optical signal created by low frequency ground vibrations received by the buried optical fiber;
    a processor coupled to the detector and configured to receive the received optical signals; and
    a data store coupled to the processor configured to contain one or more representations of prearranged optical signals corresponding to predefined low frequency vibration patterns and a set of executable instructions that when executed cause the processor to identify the location of low frequency ground vibrations associated with a received optical signal, analyze the received optical signal using an approximation algorithm that adds environmental condition variables to the received optical signal forming a conditioned optical signal, compare the conditioned optical identify the low frequency ground vibration location corresponding to the matched conditioned optical signal as a non-threatening disturbance when a comparison determines that the conditioned optical signal matches one prearranged optical signal.

7. The system according to claim 6 wherein the processor is further configured to compare the location of a low frequency ground vibration associated with one received conditioned optical signal with the locations of low frequency ground vibrations associated with other received conditioned optical signals.

8. The system according to claim 7 wherein received conditioned optical signals having an associated low frequency ground vibration within a predetermined distance of a non-threatening disturbance location are identified as a non-threatening disturbance location.

9. The system of claim 6 further comprising a vibrator configured to generate low frequency ground vibrations that match one or more predefined low frequency vibration patterns of the one or more representations of prearranged optical signals.

10. The system of claim 9 wherein the low frequency ground vibrations are coupled to the ground via a rod inserted into the ground.

11. The system of claim 9 wherein the low frequency ground vibrations are coupled to the ground via a metal plate placed on a surface of the ground.

12. The system of claim 9 wherein the vibrator is attached to a piece of equipment such that the vibrator's low frequency ground vibrations are coupled to the ground where the equipment contacts the ground.

13. The system of claim 9 wherein the environmental condition variables condition the received optical signal according to ground characteristics such as packed, loose, wet and dry soil at the location of the low frequency ground vibration associated with the received optical signal.

14. A method of identifying a zone of non-threatening disturbances along a buried optical fiber comprising:
    inputting a light into a first end of the buried optical fiber;
    receiving an optical signal from the first end of the buried optical fiber created by a low frequency ground vibration received at a location along the buried optical fiber;
    identifying the location along the buried optical fiber where the low frequency ground vibration was received;
    analyzing the received optical signal using an approximation algorithm comprising:
        adding environmental condition variables to the received optical signal forming a conditioned optical signal;
        comparing the conditioned optical signal with a set of prearranged optical signals, the prearranged optical signals corresponding to predefined low frequency ground vibration patterns; and
        identifying the low frequency ground vibration location as a non-threatening disturbance when the comparison determines that the conditioned optical signal matches one prearranged optical signal from the set of prearranged optical signals
    receiving a second optical signal from the first end of the buried optical fiber caused by a second low frequency ground vibration received at a location along the buried optical fiber;
    identifying the location along the buried optical fiber where the second low frequency ground vibration was received;
    determining whether the location of the second low frequency ground vibration is in a non-threatening disturbance zone; and
    identifying the second low frequency ground vibration as a non-threatening disturbance when the second low frequency ground vibration location is in a non-threatening disturbance zone.

15. The method according to claim 14 further comprising discontinuing monitoring received optical signals from non-threatening disturbance zones.

16. The method according to claim 14 further comprising introducing a low frequency ground vibration into the ground using a vibrator.

17. The method according to claim 16 further comprising controlling the vibrator to produce a low frequency ground vibration signature that matches one or more of the set of prearranged optical signals.

18. The method according to claim 17 further comprising coupling the vibrator's low frequency ground vibration signature to the ground using a rod inserted into the ground.

19. The method according to claim 17 further comprising coupling the vibrator's low frequency ground vibration signature to the ground using a metal plate placed on a surface of the ground.

20. The method according to claim 17 further comprising attaching the vibrator to a piece of equipment such that the vibrator's low frequency ground vibration signature is coupled to the ground where the equipment contacts the ground.

21. The method of claim 16 wherein the environmental condition variables condition the received optical signal according to ground characteristics such as packed, loose, wet and dry soil at the location of the low frequency ground vibration.

* * * * *